US005946274A

United States Patent [19]

Yamaguchi et al.

[11] Patent Number: 5,946,274

[45] Date of Patent: Aug. 31, 1999

[54] SWITCH DEVICE AND ELECTRONIC DEVICE WHICH INCLUDES SUCH SWITCH DEVICE

[75] Inventors: Masanobu Yamaguchi, Fussa; Wataru Yamada, Tachikawa; Masayoshi Tanazawa, Fuchu, all of Japan

[73] Assignee: Casio Computer Co., Ltd., Tokyo, Japan

[21] Appl. No.: 08/984,660

[22] Filed: Dec. 3, 1997

[30] Foreign Application Priority Data

Dec. 11, 1996 [JP] Japan .................................... 8-330094

[51] Int. Cl.[6] .......................... C04B 19/30; G04C 17/00; H01H 35/00; H02B 1/24

[52] U.S. Cl. ................................ 368/67; 368/69; 368/82; 307/116; 307/121; 307/122

[58] Field of Search .......................... 368/67, 69, 82–84, 368/227, 239–242; 307/116–122

[56] References Cited

U.S. PATENT DOCUMENTS 3,823,550 7/1974 Bergey ...................................... 368/69
3,921,385 11/1975 Harding et al. ........................... 368/69
4,036,007 7/1977 Shelley ...................................... 368/69
4,095,408 6/1978 Kashio ...................................... 368/69
5,612,931 3/1997 Sato et al. .

*Primary Examiner*—Vit Miska
*Attorney, Agent, or Firm*—Frishauf, Holtz, Goodman, Langer & Chick

[57] ABSTRACT

When an inclination switch SW3 is turned on by inclining a wristwatch 12 up at 12 o'clock within a predetermined time after an acceleration switch SW2 is turned on in a state where an auto mode on/off subswitch SW1-1 is on, a lighting circuit lights up an electroluminescence panel EL and puts off same automatically after a predetermined time has passed. If the auto mode subswitch SW1-1 is off, there is no possibility that the panel EL will be lighted up even when the user makes a motion to look at the time displayed on the wristwatch. As a result, the panel EL is not recklessly lighted up excluding by the user's intended motion, useless power consumption is suppressed to prolong the life of a battery used.

15 Claims, 15 Drawing Sheets

"NEUTRAL" POSITION

"PULLED-OUT" POSITION

"PUSHED-IN" POSITION

SWITCH DEVICE AND ELECTRONIC DEVICE WHICH INCLUDES SUCH SWITCH DEVICE

BACKGROUND OF THE INVENTION

The present invention relates to switch devices which each are turned on against a user's intention and electronic devices which each include such switch device.

Wristwatches are known which each illuminate its face or liquid crystal time display unit with a luminescence element such as a lamp or electronic luminescence element so as to allow for us to recognize the time even in a dark place.

Wristwatches of this kind include some which is provided with a lamp which is lighted up in response to the user turning on a specific switch, and some which are lighted up for a predetermined interval of time in response to the user's turning on a switch.

As shown in U.S. Pat. No. 5,612,931, wristwatches are known which include a posture detection switch which detects one motion of a user's gestures made when the user looks at the wristwatch to thereby light on a lamp.

Whenever the user desires to illuminate the face of the wristwatch, however, the user must manipulate the switch. Thus, for example, when the user' hands are occupied with some baggage, the manipulation of the wristwatch is troublesome.

For instance, in a wristwatch which uses a posture detection switch which detects that the face of the wristwatch is inclined up at 12 o'clock for the user to look at the face to thereby light up the lamp, it is unnecessary to manipulate the switch to light up the lamp. However, even in that case, when the wristwatch takes such posture, the lamp would directly be lighted up, thereby inviting useless electric power consumption, and shortening the battery longevity.

Therefore, it is an object of the present invention to provide a switch device whose operation is never performed without the user's intended motion, and an electronic device (wristwatch) which uses such switch device.

SUMMARY OF THE INVENTION

In order to achieve the above object, according to the present invention, there is provided a switch device comprising:

- first switch means turned on depending on a shock given to the switch device;
- second switch means turned on when the switch device assumes a predetermined posture;
- circuit means for performing a predetermined operation; and
- control means responsive to the first and second switch means turning on for causing the circuit means to perform the predetermined operation.

According to the composition of the above composition, the circuit means of the switch device is operated when the switch device is given a shock so as to take a predetermined posture. The switch device is not recklessly operated except by the user's intended operation.

In order to achieve the above object, according to the present invention, there is also provided an electronic device comprising:

- display means;
- illuminating means for illuminating said display means;
- first switch means turned on in response to a shock given to the electronic device;
- second switch means for detecting a posture of the electronic device, the second switch means being turned on when the electronic device assumes a predetermined posture; and
- illumination control means responsive to the first and second switch means turning on for operating the illuminating means.

According to this composition, the illuminating means is lighted up only when a shock is given to the electronic device so as to take a predetermined posture. The illuminator is never recklessly lighted up except by the user's intended operation.

DESCRIPTION OF THE PREFERRED EMBODIMENTS

(1 ) First Embodiment

Figure 1:
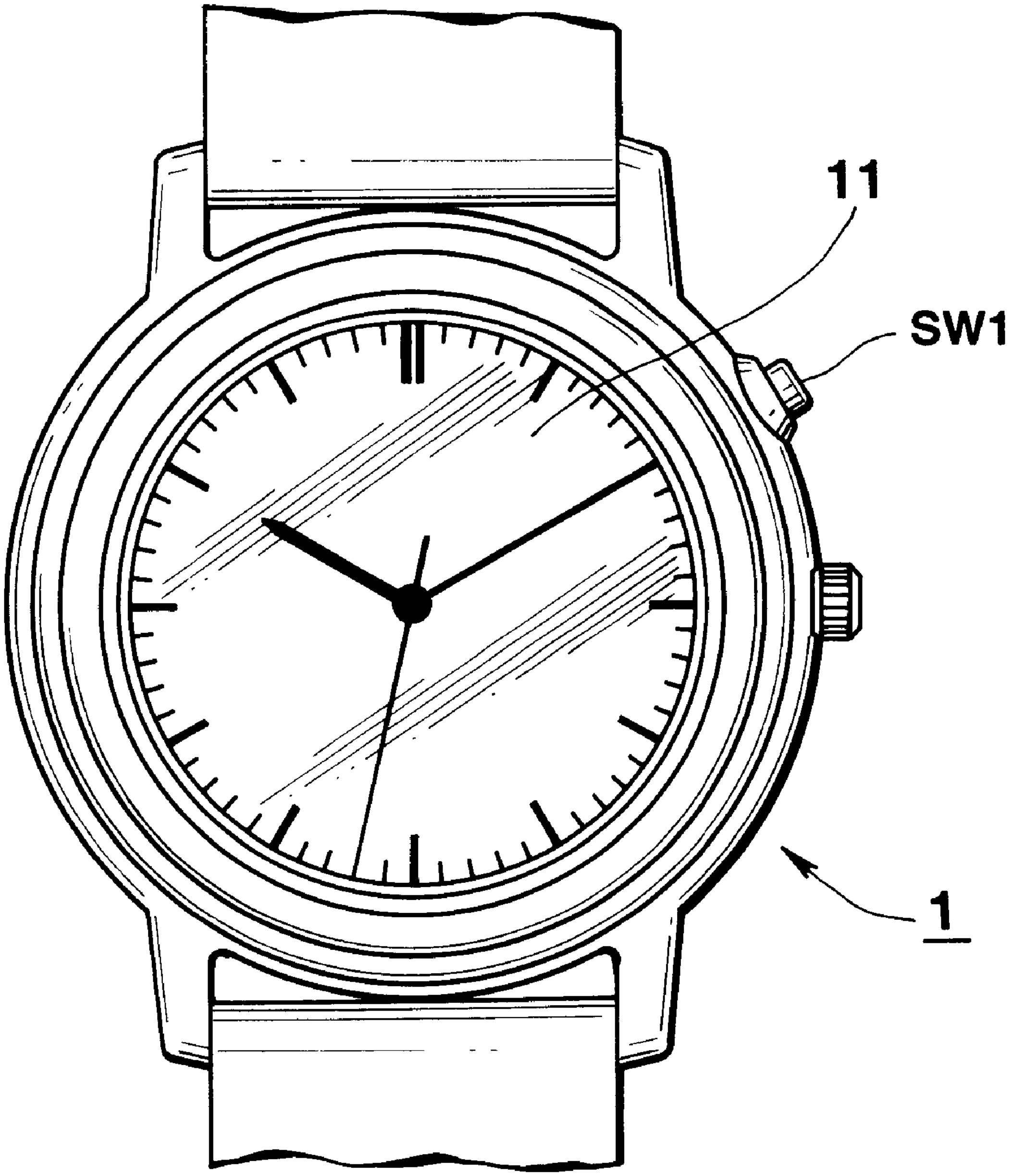
FIG. 1 is a plan view of a wristwatch as a first embodiment of this invention.

Now, a first embodiment of this invention as a wristwatch will be explained referring to the accompanying drawings. As shown in FIG. 1, the wristwatch 1 includes a face 11 composed of an electroluminescence element or panel EL which is lighted up so that the user can recognize time even in a dark place. A switch SW1 is provided on the right-hand side of the wristwatch to select any one of an auto electroluminescence mode, an electroluminescence off mode, and a compulsive lightening mode. The switch SW1 can sequentially select three positions: that is, a pulled-out position, a neutral position, and a pushed-in position by pushing the switch sequentially. When the switch SW1 is at the pulled-out position, the auto electroluminescence mode is set in which the electroluminescence element or panel is automatically lighted up. Thus, when an acceleration switch and an inclination switch which will be described later are turned on, the electroluminescence element is automatically lighted up. When the switch SW1 is pushed in at the pulled-out position, the switch will assume the neutral position, the auto electroluminescence mode is unset, and the electroluminescence element is turned off. When the switch SW1 is pushed in at the neutral position, it takes the pushed-in position to set a compulsive lightening mode in which the electroluminescence element is compulsively lighted up. The switch is returned to the initial pulled-out position when the switch is again pushed in at the pushed-in position.

Figure 2:
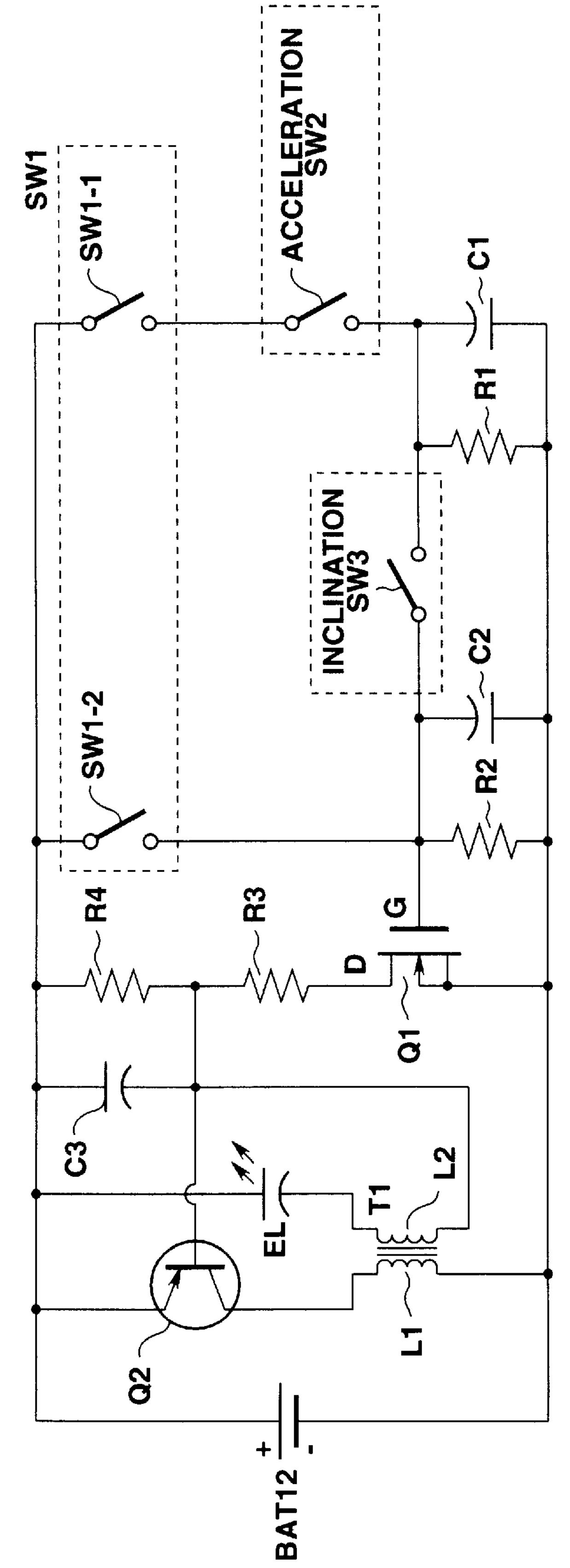
FIG. 2 is a circuit diagram of a lighting circuit of an illumination device of the first embodiment.

FIG. 2 is a circuit diagram of an electroluminescence element lighting circuit of the wristwatch. The switch SW1 consists of a subswitch SW1-1 which automatically sets one of electroluminescence on and off modes, and a subswitch SW1-2 which sets a compulsion lighting mode. When the switch SW1 is at the pulled-out position, the subswitch SW1-1 is on to sets the auto electroluminescence on mode. When the switch SW1 is at the neutral position, the subswitch SW1-1 is off to set the electroluminescence off mode. When the switch SW1 is at the pushed-in position, the subswitch SW1-2 is on to set the compulsive lighting mode for the electroluminescence element.

Figure 3:
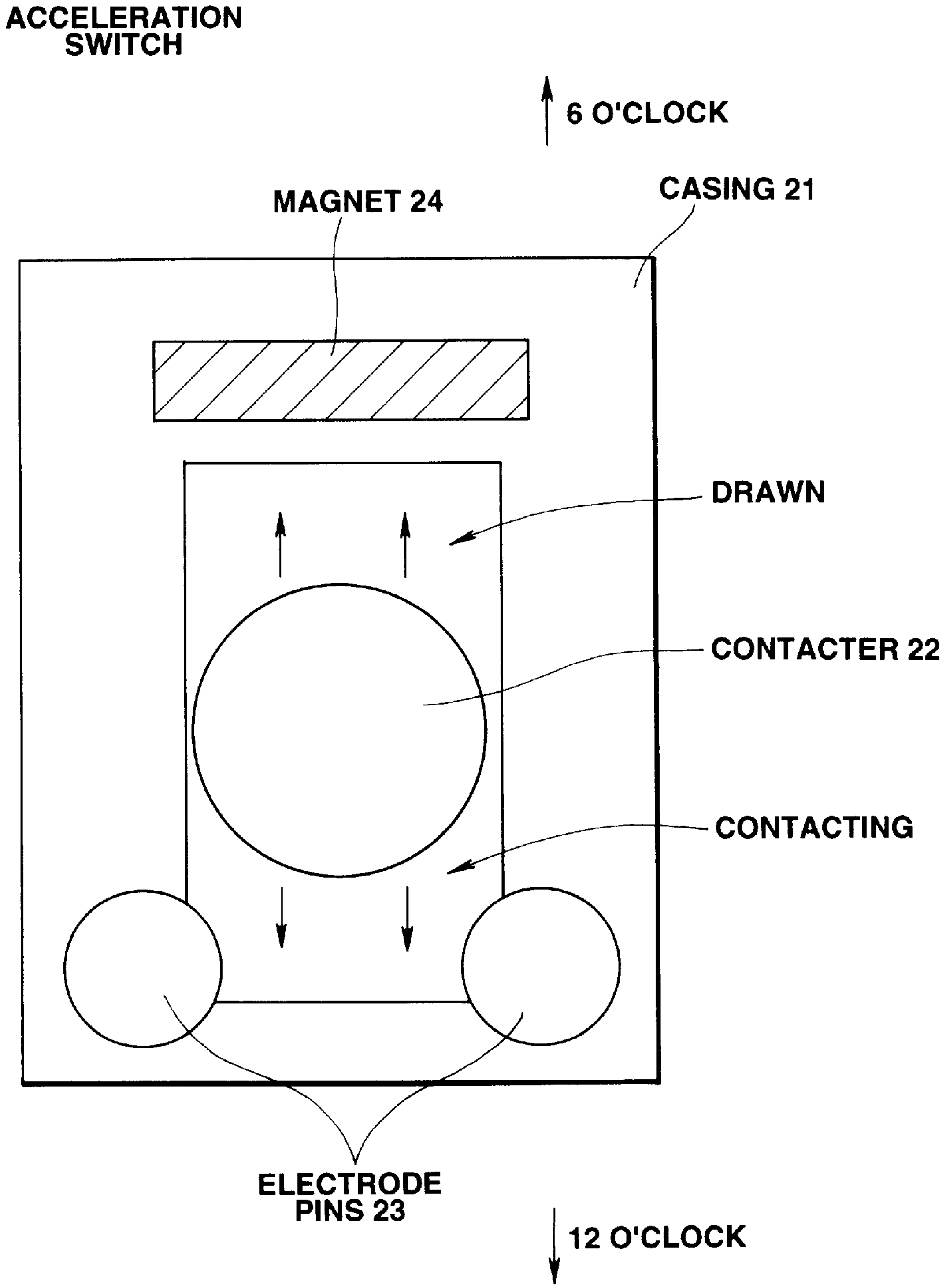
FIG. 3 shows an internal structure of an acceleration switch of the first embodiment.

As shown in FIG. 3, an acceleration switch SW2 consists of a casing 21, a movable conductive ball-like contacter 22, a pair of electrode pins 23, and a magnet 24. The contacter 22 is normally drawn by the magnet 24 to thereby be separated away from the electrode pins 23, so that the switch SW2 is off. When the user who wears the wristwatch shakes his or her arm, so that acceleration is applied to the wristwatch at 12 o'clock of its face 11, a force acts to move the contacter 22 away from the magnet 24, and the contacter 22 comes into contact with the two electrode pins 23 to place same in an electrically conductive state to thereby turn on the acceleration switch SW2.

Figure 4:
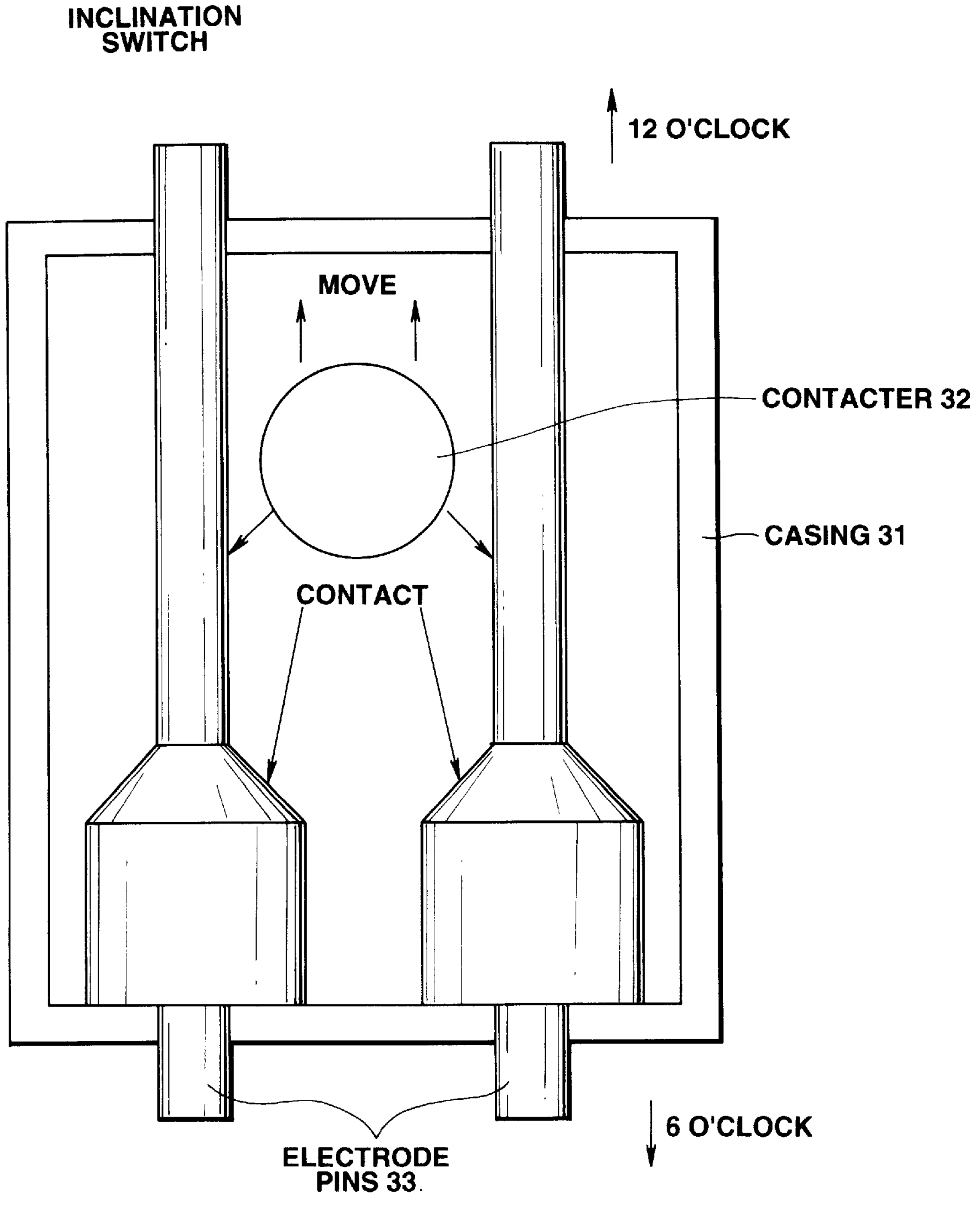
FIG. 4 shows an internal structure of an inclination switch of the first embodiment.

As shown in FIG. 4, an inclination switch SW3 of FIG. 2 consists of a casing 31, a movable conductive ball-like contacter 32 and a pair of electrode pins 33, each having a larger base. When the wristwatch is inclined, the contacter 32 is freely movable down in the direction of that inclination. The contacter 32 comes in contact with only one of the electrode pins 33 when the wristwatch is inclined in a direction other than 6 o'clock of its face 11. Therefore, the electrode pins 33 are placed in a non-conductive state and the switch SW3 is off. When the wristwatch is inclined up at 12 o'clock of the face 11 and down at six o'clock, the contacter 32 moves downward in FIG. 4 (at six o'clock) and the contacter 32 comes in contact with the bases of the two electrode pins 33. As a result, the two electrode pins 33 are placed in the conductive state by the contacter 32 and the switch SW3 is turned on.

In FIG. 2, the subswitch SW1-1 which turns on and off the auto electroluminescence mode and the acceleration switch SW2 are connected in series with a capacitor C1. Therefore, when acceleration is applied to the main body of the wristwatch at 12 o'clock in the auto electroluminescence on mode, the acceleration switch SW2 is turned on, and the capacitor C1 is then charged by the battery 12.

In addition, the capacitor C1 is connected at one end with an end of each of a resistor R1 and the inclination switch SW3. The inclination switch SW3 is connected at the other end with one end of each of a capacitor C2 and a resistor R2, and a gate G of a MOS-FET Q1. The capacitor C2 absorbs chattering of the inclination switch SW3.

Therefore, when the acceleration switch SW2 is turned on in the auto electroluminescence mode, and the wristwatch is then inclined down at 6 o'clock of the face 11, so that the inclination switch SW3 is turned on, the resistors R1 and R2 will be connected in parallel with capacitor C1. The capacitor C1 begins discharging with a time constant determined by the capacity of the capacitor C1, and the value of the parallel-connected resistors R1 and R2. Because a voltage across the capacitor C1 is applied to the gate G of the MOS-FET Q1, the MOS-FET Q1 maintains its on-state until the voltage across the capacitor C1 falls below a gate on voltage of the MOS-FET Q1.

The gate G of the MOS-FET Q1 is connected with the anode of battery 12 through the subswitch SW1-2. The drain D of the MOS-FET Q1 is connected with the anode of the battery 12 through resistors R3 and R4. The junction point of the resistors R3 and R4 is connected with the base of a transistor Q2. Each of a capacitor C3 and a secondary winding L2 of a transformer T1 is connected at one end with the base of the transistor Q2 with a secondary winding L2 being at the other end connected with the electroluminescence element EL. The collector of the transistor Q2 is connected with a primary winding of the transformer T1. An electroluminescence element drive circuit is composed of the transformer T1, electroluminescence element EL, transistor Q2, resistor R3, and capacitor C2.

Next, the operation of the above-mentioned circuit in the auto electroluminescence on mode will be explained. If the user shakes his or her wrist at 12 o'clock of the face 12 at the pulled-out position of the switch SW1 or in the auto electroluminescence on mode, the acceleration switch SW2 is turned on and the capacitor C1 is charged electrically. If the acceleration fails to be applied to the main body of the wristwatch, the acceleration switch SW2 is turned off. At this time, when the user makes a motion to confirm the time or incline the wristwatch down toward the ground surface at 6 o'clock of the face 11, the contacter 32 of FIG. 4 moves at 6 o'clock, the electrode pins 33 are placed in the conductive state, and the inclination switch SW3 is then turned on. This causes the voltage across the capacitor C1 to be applied to the gate G of the MOS-FET Q1. Simultaneously, the voltage across the capacitor C1 begins discharging via the parallel-connected resistors R1 and R2.

When the MOS-FET Q1 is turned on, a voltage determined by the values of the resistors R3 and R4 is applied to the base of the transistor Q2 to turn on the transistor Q2. As a result, the electroluminescence drive circuit begins self-excitation oscillation to light up the electroluminescence element EL. The lightening up of the electroluminescence element continues while the inclination switch SW2 is on until the voltage across the capacitor C1 applied to the gate G of the MOS-FET Q1 falls below the predetermined gate on voltage, whereupon the electroluminescence element becomes unlighted. When the wristwatch is returned from its posture to confirm the time to the original posture after the time is confirmed by lighting up the electroluminescence element EL, the inclination switch SW3 is turned off and the electroluminescence element EL becomes unlighted.

If the user does not assume a posture in which the face 11 of the wristwatch inclines down at 6 o'clock to confirm the time even when the acceleration switch SW2 is turned on in the auto electroluminescence on mode, the inclination switch SW3 and hence the MOS-FET Q1 are not turned on, and the electroluminescence element EL is not lighted up.

On the other hand, when the subswitch SW1-2 is turned on to set the compulsive lighting mode, the voltage of the battery 12 is applied to the gate G of the MOS-FET Q1 to turn on same and the electroluminescence element EL is lighted up in a manner similar to that mentioned above. In this case, the MOS-FET Q1 maintains its on state and the electroluminescence element EL is lighted up while the subswitch SW1-2 is on.

The subswitch SW1-1 is off in the electroluminescence off mode. Therefore, even when the acceleration switch SW2 is turned on, the capacitor C1 is not charged and the MOS-FET Q1 remains being off.

(2 ) Second Embodiment

Next, a second embodiment of the present invention to control lighting up the electroluminescence element EL depending on the brightness of its external environment will be explained in FIG. 5.

Figure 5:
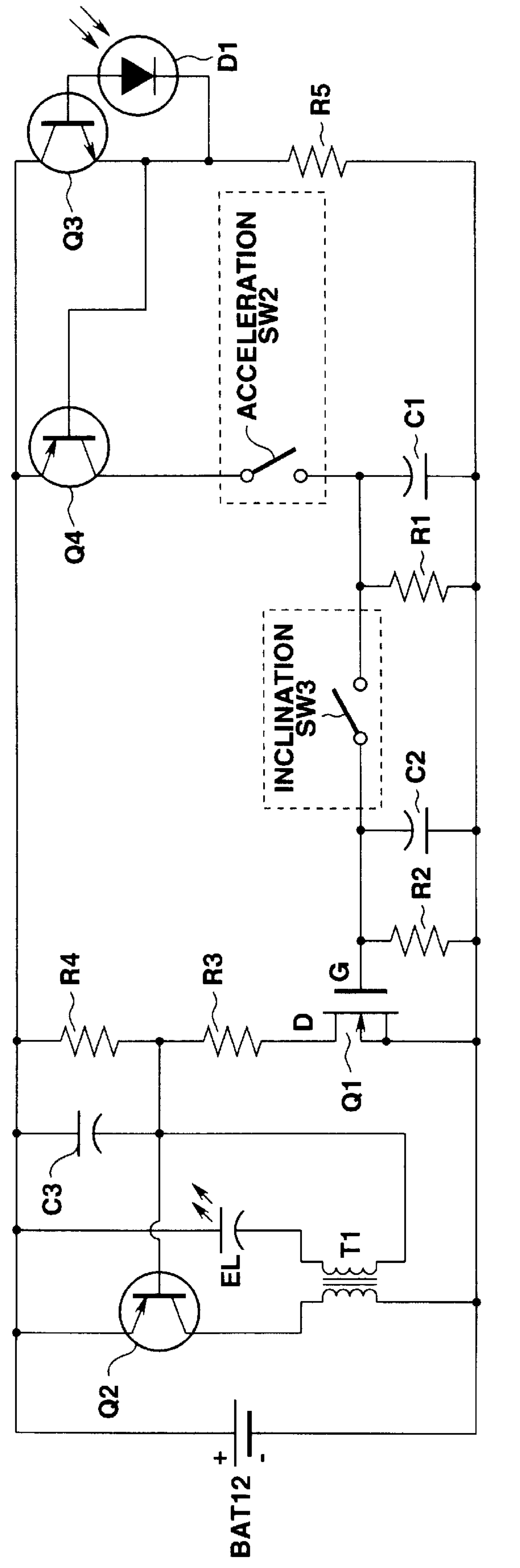
FIG. 5 is a block diagram of a lighting circuit of an illumination device of a second embodiment of this invention.

The lighting circuit of FIG. 5 is the same in basic composition as that of FIG. 2 and the circuit parts of FIG. 5 which are different from those of FIG. 2 will be described below.

In FIG. 5, a photodiode D1 is connected across a base and an emitter of a transistor Q3. If the photodiode D1 detects an optical amount of more than a predetermined one, a voltage generated across the photodiode D1 is applied to the transistor Q3 across its base and emitter to thereby turn on the transistor Q3. A resistor R5 and a base of the following transistor Q4 are connected with the emitter of the transistor Q3. The emitter of the transistor Q4 is connected with the battery 12, and the collector of the transistor Q4 is connected with an end of the acceleration switch SW2.

An optical amount of more than the predetermined amount is applied to the photodiode D1 when the external environment is bright to thereby generate an electromotive force, which turn on the transistor Q3. As a result, the voltage of the battery 12 is applied to the base of the transistor Q4. Therefore, a reverse bias is applied to the transistor Q4 across its base and emitter to thereby turn off the transistor Q4. This does not cause the electroluminescence element EL to light up because the capacitor C1 is not charged even when the acceleration switch SW2 is turned on.

On the other hand, when the external environment is dark, little electromotive force is hardly generated across the photodiode, the transistor Q3 is off and the battery 12 voltage is not applied to the base of the transistor Q4. Thus, the ground potential is applied to the base of the transistor Q4 to thereby turn on same.

As a result, the mode becomes the same as the auto electroluminescence on mode. Therefore, the electroluminescence element EL lights up when the acceleration switch and the inclination switch are turned on.

In this second embodiment, even if the user shakes his or her wrist on which the wristwatch is worn, and makes a motion to confirm the time to thereby turn on the acceleration and inclination switches SW2 and SW3 when the external environment is blight, the electroluminescence element EL does not light up because the transistor Q4 is off. Therefore, when it is not necessary to light up the electroluminescence element EL, lighting up the electroluminescence element EL and hence useless consumption of the electric power are prevented.

(3 ) Third Embodiment

Figure 6:
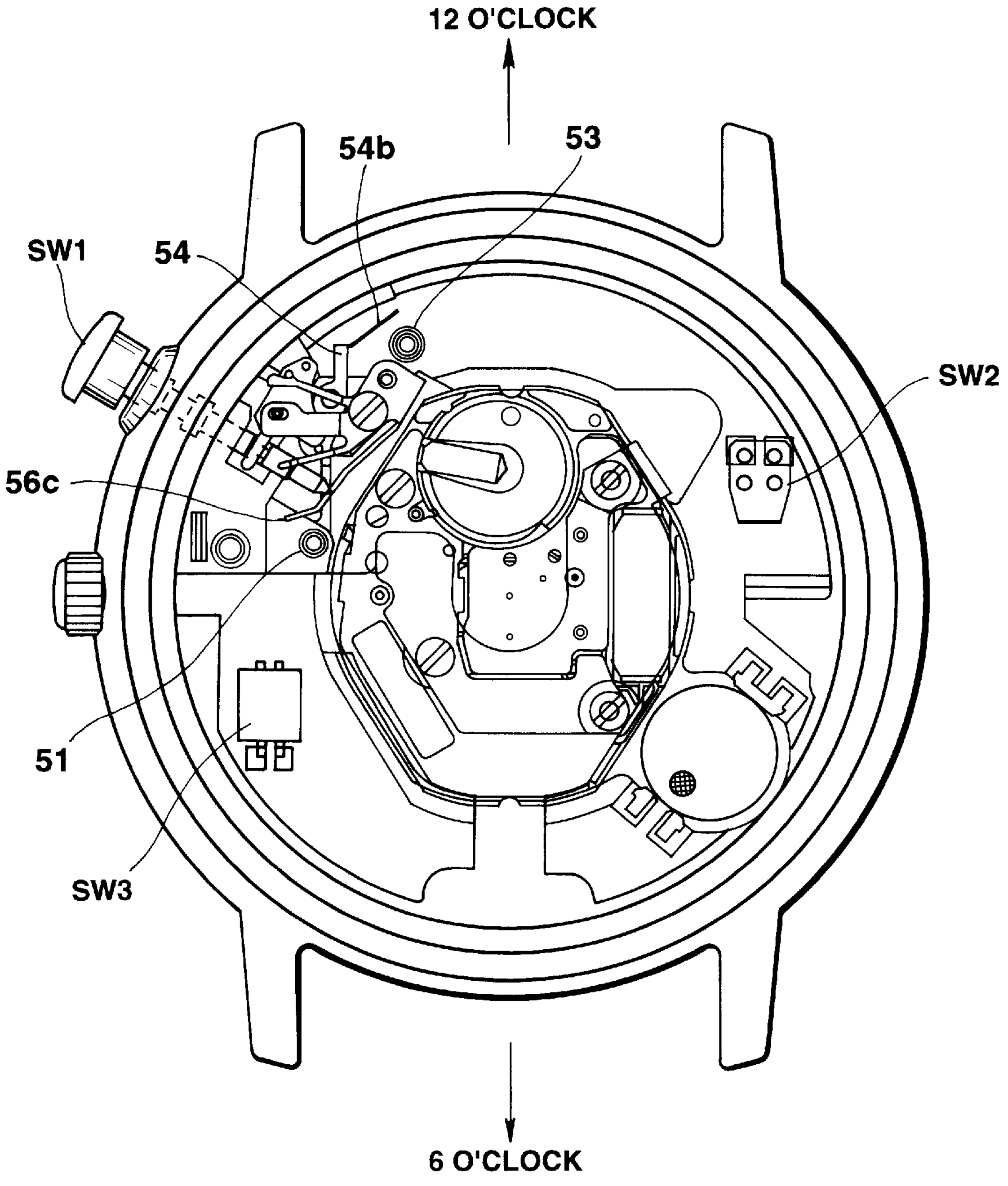
FIG. 6 schematically shows the structure of a movement of a wristwatch as a third embodiment of this invention.

FIG. 6 is a bottom view of a wristwatch which includes a switch device as a third embodiment of the present invention with a back cover being removed away. A switch SW1 provides a switching input to a lighting circuit, which will be described later, to light up an electroluminescence panel EL depending on the respective "pulled-out", "neutral" and "pushed-in" positions, as in the first embodiment.

The switch SW1 is composed of a temporary lighting subswitch SW1-2 which temporarily and compulsively lights up the electroluminescence panel EL, and an auto mode on/off subswitch SW1-1 which makes effective or inhibits setting an auto mode which automatically lights up/turns off the panel depending on the outputs of an acceleration switch SW2 and an inclination switch SW3 which will be described later.

More specifically, the temporary lighting switch SW1-2 is composed of a coil spring 51 and a contact spring 52*c* of FIG. 6 which is brought into contact with the coil spring 51 depending on the pushing-in operation of the switch SW1.

The auto mode on/off subswitch SW1-1 is composed of a coil spring 53 and a contact spring 54*b* for a lever 54 which is brought into contact with the coil spring 53 depending on the pulling-out operation of the switch SW1.

Figure 7:
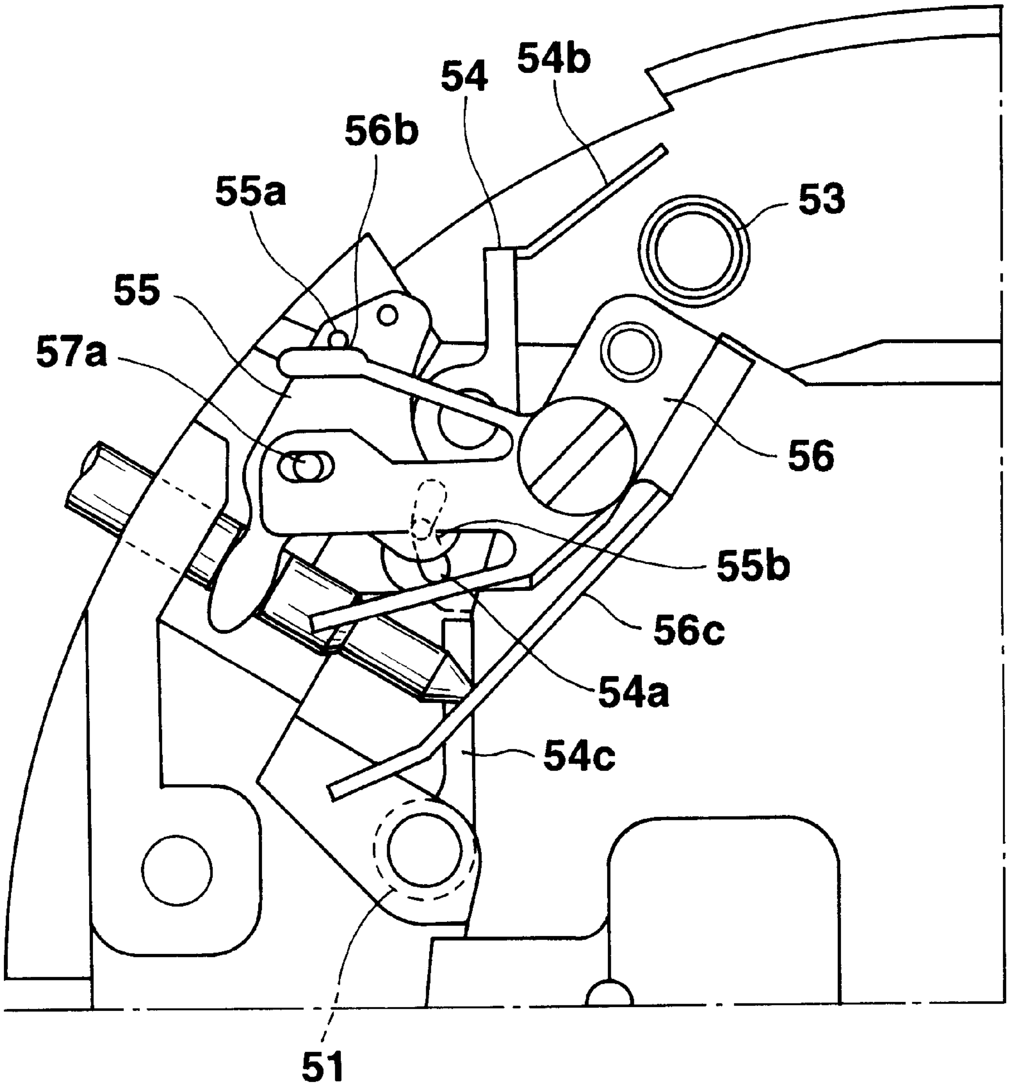
FIG. 7 shows the mechanism of a switch SW1 at a neutral position.

When the switch SW1 is at the "neutral" position, a pin 55*b* disposed on the back of a setting lever 55 is located at substantially the center of a slot 54*a* in a yoke 54, as shown in FIG. 7. Thus, the contact spring 54*b* for the yoke 54 is separated from the coil spring 53, so that the auto mode on/off subswitch SW1-1 is off to thereby inhibit setting the auto mode).

In this case, because the rod-like switch SW1 does not move axially, a contact spring 56*c* for a setting lever jumper 56 is separated from the coil spring 51, so that the subswitch 1-2 is off.

Figure 8:
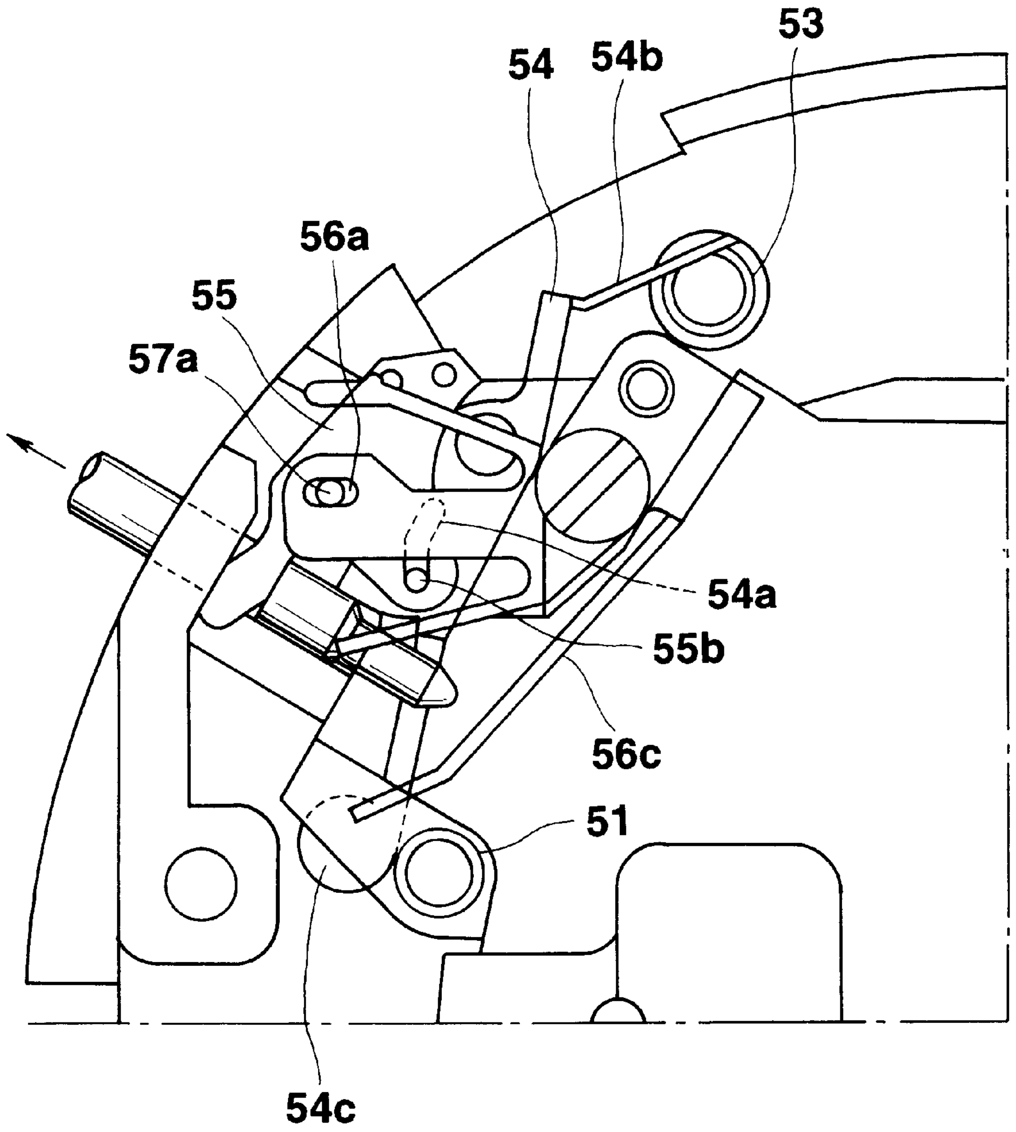
FIG. 8 shows the mechanism of the switch SW1 at a pulled-out position.

When the switch SW1 is pulled out from the "neutral" position to the "pulled-out" position", the setting lever 55 turns clockwise around a fixed pin 57*a,* as shown in FIG. 8. This causes the pin 55*b* on the back of the setting lever 55 to slide downward in the slot 54*a* in the yoke 54. Then, the yoke 54 turns clockwise around a pivot (not shown), so that the contact spring 54*b* for the yoke 54 comes into contact with the coil spring 53. As a result, the auto mode on/off subswitch SW1-1 is turned on, and the auto mode described later becomes effective.

When the switch SW1 is at the "pulled-out" position, the contact spring 56*c* for the setting lever jumper 56 has the same position as when the switch SW1 is at the "neutral" position. Therefore, the contact spring 56*c* remains separated from the coil spring 51, so that the temporary lighting subswitch SW1-2 remains turned off.

As the switch SW1 is pushed in from the "neutral" position to the pushed-in" position, the setting lever 55 turns counterclockwise around the pin 57*a*. Then, the pin 55*b* on the back of the setting lever 55 slides upward in the slote 54*a* in the yoke 54 . Therefore, the yoke 54 does not turn, and keep the same state as when the switch SW1 is at the "neutral" position. Thus, the contact spring 54*b* does not come in contact with the coil spring 53 or remains separated from same. As a result, the auto mode on/off subswitch SW1-1 is off to prohibit setting the auto mode.

When the switch SW1 is pushed in to the "pushed-in" position, it moves axially to push the contact spring 56*c* for the setting lever jumper 56 to thereby bring the spring 56*c* in contact with the coil spring 51. As a result, the subswitch SW1-2 is turned on.

As will be obvious from the above, the switch SW1 is composed of the temporary lighting subswitch SW1-2 which temporarily lights up the electroluminescence panel EL, and the auto mode on/off subswitch SW1-1 which makes effective or inhibits setting the auto mode which automatically lights/turns off the panel EL depending on the outputs of the acceleration switch SW2 and the inclination switch SW3. At the normal "neutral" position, both the subswitches SW1-1, 1-2 are placed in the off state. When the switch SW1 is set at the "pulled-out" position by the user, the subswitch SW1-1 is turned on to thereby make the auto mode effective. When the switch SW1 is set at the "pushed-out" position, the temporary lighting subswitch SW1-2 is turned on to thereby light on the electroluminescence panel EL compulsively.

Figure 10:
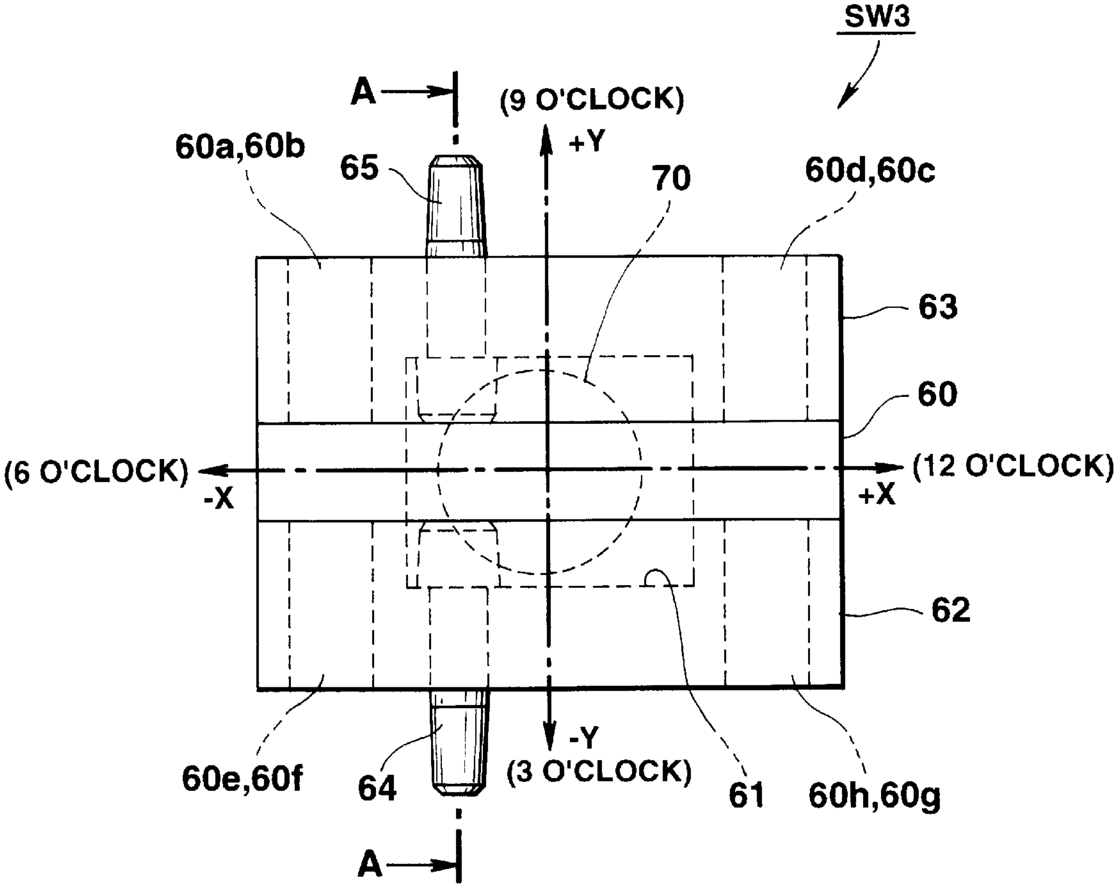
FIG. 10 is a plan view of an inclination switch as a third embodiment.
Figure 12:
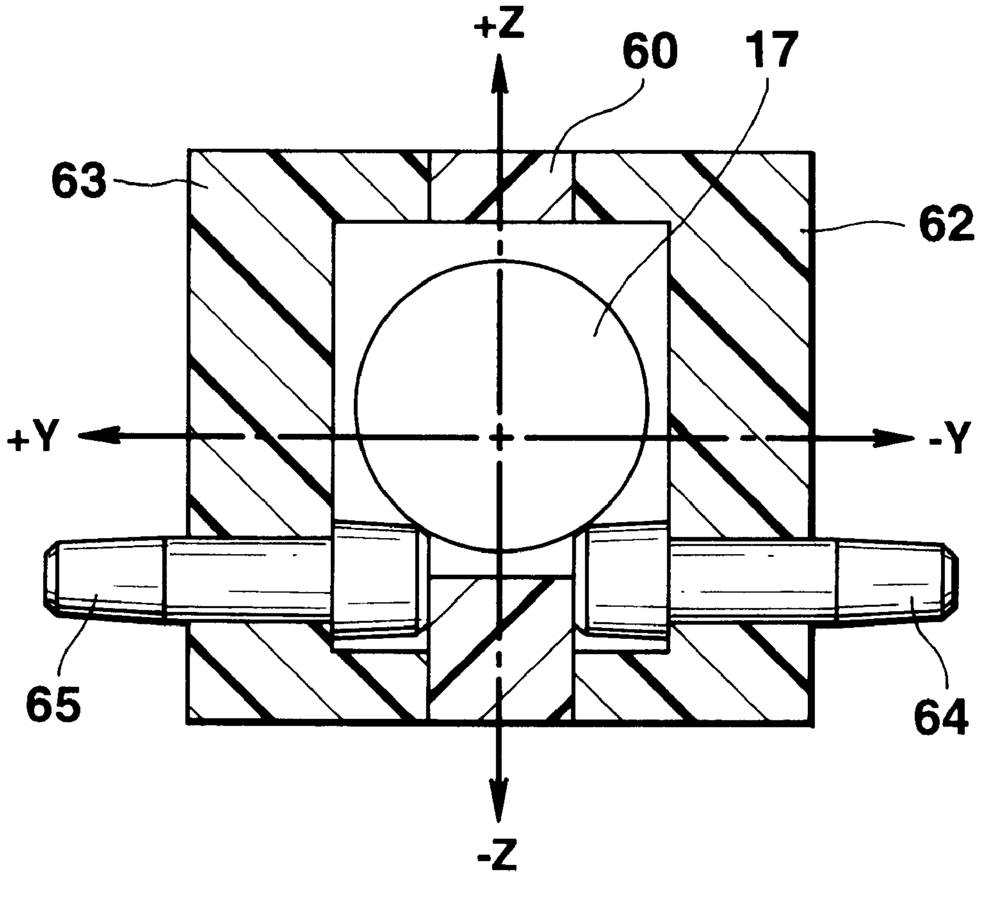
FIG. 12 is a cross-sectional view taken along line XII—XII of FIG. 10.
Figure 13:
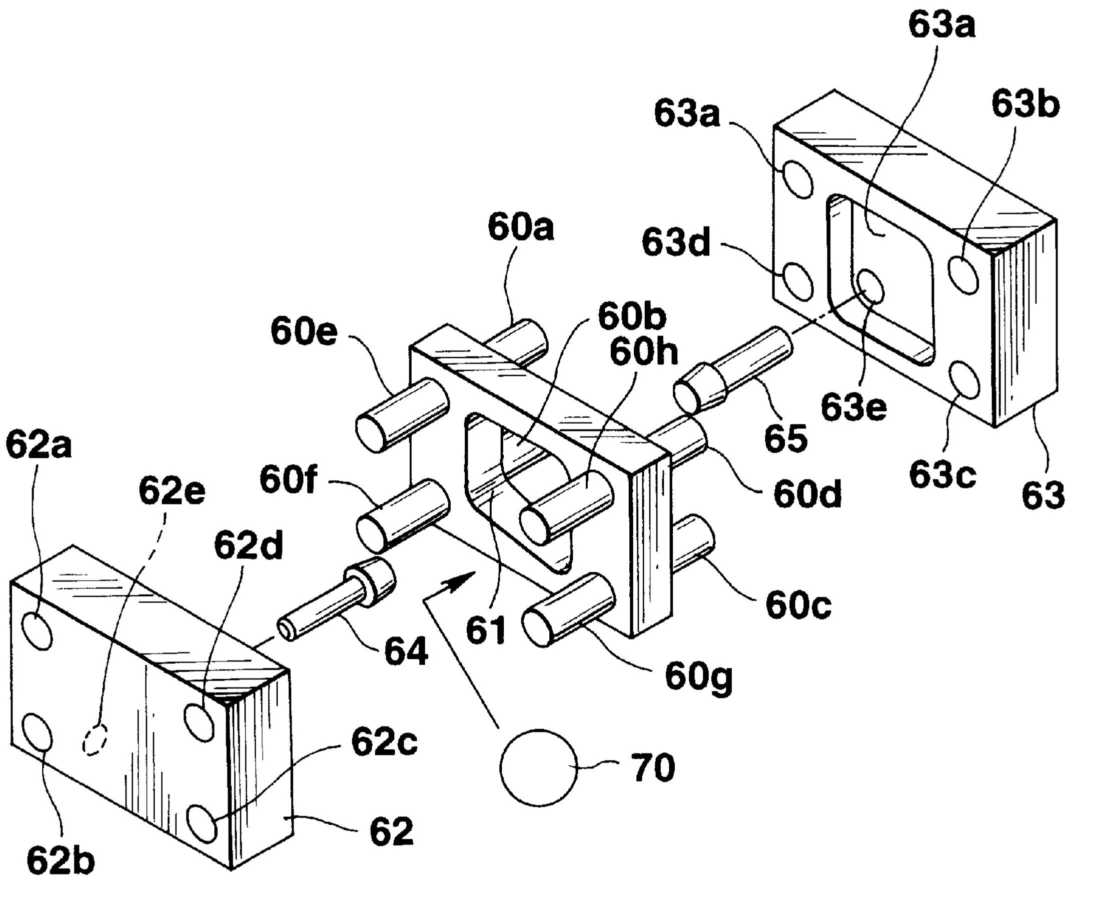
FIG. 13 is an exploded perspective view of the FIG. 10 inclination switch.

Next, the composition of the inclination switch SW3 arranged on the movement of the wristwatch will be explained. The inclination switch SW3 is arranged to be turned on when the wristwatch assumes a predetermined posture and more particularly a predetermined inclination angle so that the user may look at the wristwatch worn on his or her wrist for time recognition. The inclination switch SW3 will be explained referring to a plan view of FIG. 10, a side view of FIG. 11, a cross-sectional view of FIG. 12 taken along line XII—XII of FIG. 10, and an exploded perspective view of FIG. 13.

The inclination switch SW3 is composed of an inner synthetic resin frame 60 in the form of a rectangular parallelepiped, a pair of outer synthetic resin frames 62 and 63 of the same size as the inner frame and attached to opposite sides of the inner frame 60, a metal ball 70 placed within a trapezoidal hole 61 in the inner frame 60, and a pair of electrode pins 64 and 65 which protrudes into the hole 61 in the inner frame 60 through the outer frames 62 and 63.

The inner frame has two pairs of connecting corner pins 60*a*–60*d* and 60*e*–60*g* inserted into two corresponding pairs of corner holes 62*a*–62*d* and 63*a*–63*e* in the outer frame 62 and 63, respectively, for uniting purposes. The outer frames 62 and 63 have corresponding substantially square hollows 62*a* and 63*a* on their surfaces facing the hole 61 in the inner frame 60 with three of four peripheral sides which define the respective hollows 62*a* and 63*a* being coincident with corresponding three of four peripheral sides which define the hole 61 in the inner frame 60, excluding the remaining inclined peripheral side of the hole 61, as shown in FIG. 11.

The outer frames 62 and 63 have, at predetermined positions in the hollows, corresponding through holes 62*e* and 63*e* through which metal electrode pins 64 and 65 extend. The electrode pins 64 and 65 each have a rod-like portion and a larger-diameter truncated-conical base which tapers towards the ball.

Thus, the metal ball 70 received within an inner hole space defined by the inner and outer frames 60, 62 and 63 is rollable only along the inner inclined peripheral side 61*a* of the trapezoidal hole 61.

Figure 11:
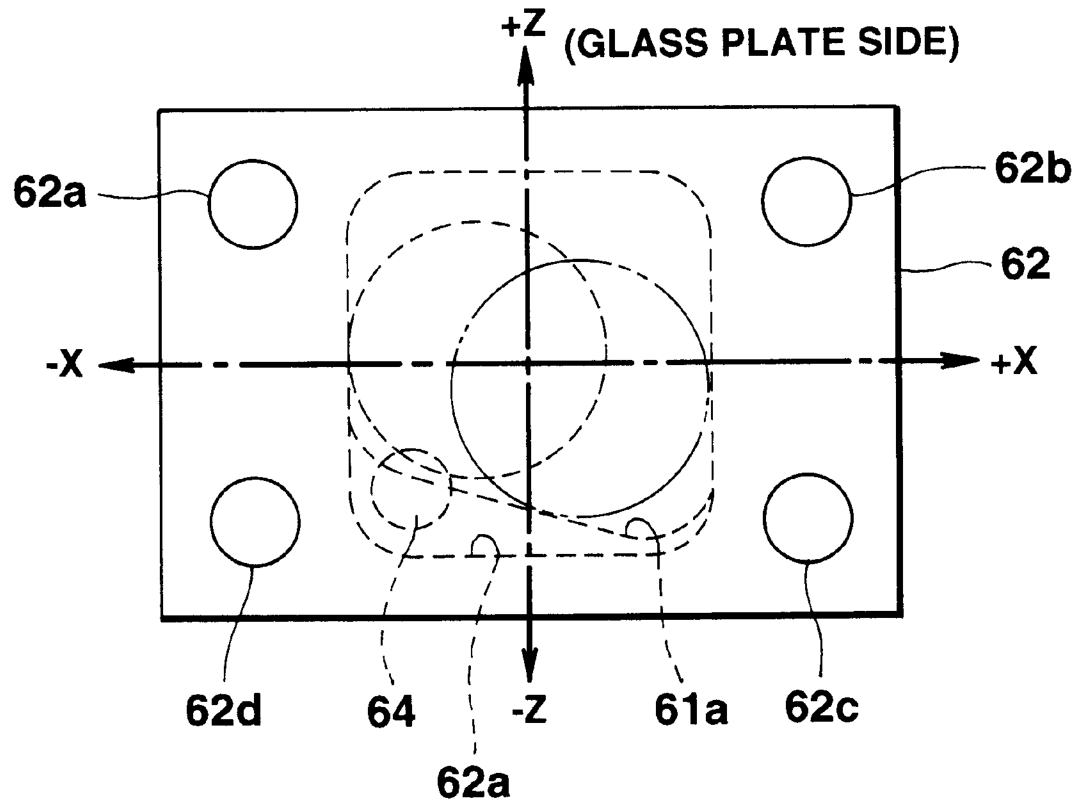
FIG. 11 is a cross-sectional view of the inclination switch of FIG. 10.
Figure 14:
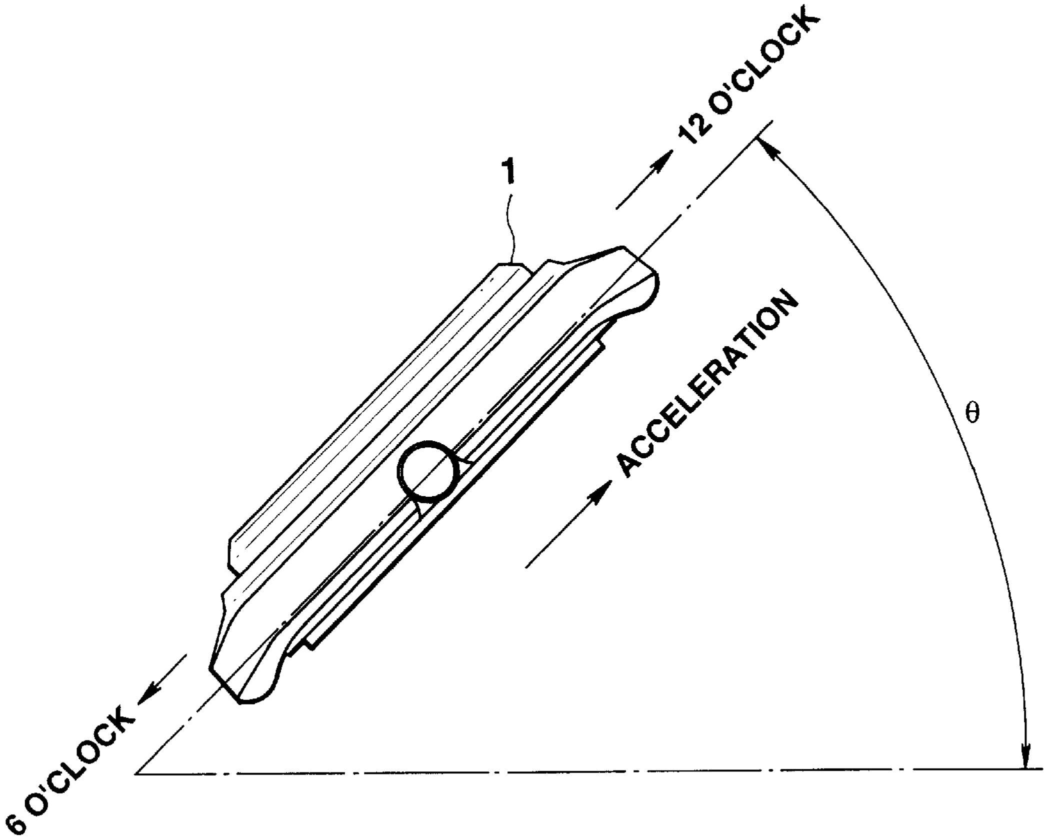
FIG. 14 shows a direction of sensitivity of the acceleration switch and the inclination switch.

Thus, when the wristwatch takes a horizontal posture, the ball 70 stays within the hole 61 at a position determined by the peripheral inclined and right-hand vertical sides which define the hole 61, as shown in FIG. 11. As shown in FIG. 14, when the wristwatch takes a predetermined posture angle of in which the wristwatch is inclined down at 6 o'clock and up at 12 o'clock, the ball 70 rolls along the peripheral inclined side 61*a* to come into contact with both the rod-like portions of the electrode pins 64 and 65 to place same in an electrically conductive state, which is an equivalent to a turned-on switch. In the particular embodiment, the switch is in a turned-on state when the posture angle is in a range of 15–90 degrees.

The acceleration switch SW2 is arranged to be turned on when a predetermined shock or acceleration applied to the wristwatch is detected, for example, when a voltage generated in a pair of pasted elongated piezoelectric elements fixed at one end to the movement of the wristwatch deformed due to the shock or acceleration applied to the pasted piezoelectric elements is detected as exceeding a predetermined voltage. Alternatively, a switch may be usable which is turned on when a static capacity of an acceleration sensor changes beyond a predetermined capacity due to a shock or acceleration being applied to the sensor.

As shown in FIG. 14, the acceleration switch 2 is arranged so as to detect a shock or acceleration applied to the wristwatch at 12 o'clock. The reason for this is that since the wristwatch 1 worn on the user's left wrist is usually inclined down at 12 o'clock when the wrist is soley bent to look at the wristwatch time and gravity acts on the wristwatch, the acceleration switch SW2 is turned on only by making a motion to look at the wristwatch time in that state and hence applying a slight shock to the wristwatch.

Figure 15:
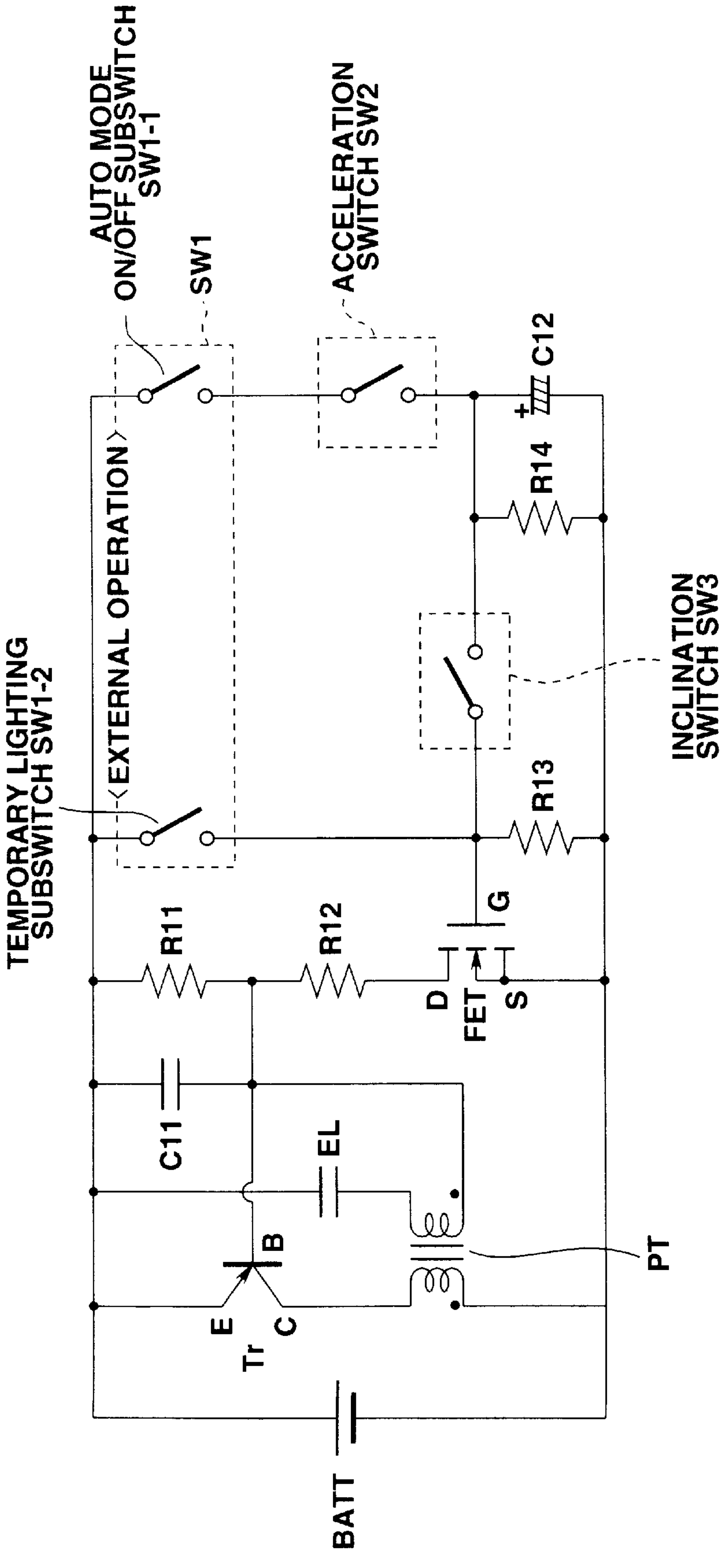
FIG. 15 is a circuit diagram of a lighting circuit of a third embodiment of this invention.

Referring to FIG. 15, the composition of a lighting circuit for the electroluminescence panel EL will be described next. In FIG. 15, reference characters Tr, PT and C1 denote a transistor, a blocking transformer, and a capacitor, respectively, which compose an blocking oscillator. The panel EL is driven with a pulse signal due to self-oscillation of the blocking oscillator to emit light. Voltage dividing resistors R11 and R12 are connected in series with an FET (Field Effect Transistor) which acts as a switching element. Reference characters R13 and R14 each denote a load resistor, and reference character C12 denotes an electrolytic capacitor which stores electric charges.

In the particular arrangement, when the temporary lighting subswitch SW1-2 is turned on, the FET is turned on, and a voltage across the resistor R12 which divides the battery voltage in cooperation with the resistor R11 is applied as a forward bias to the base of the transistor Tr to turn on same. Thus, a current flows through the primary winding of the blocking transformer PT to induce a corresponding voltage across its secondary winging.

The induced voltage is fed back to the base B of the transistor Tr to turn off same temporarily, which causes no voltage to be induced across the secondary winding of the blocking transformer PT. Thus, the base B of the transistor Tr is forward biased again to turn on same. That is, as long as the subswitch SW1-2 is on, blocking oscillation occurs in which the transistor Tr repeats turning on and off, which produces a pulse signal outputted from the secondary winding of the blocking transistor PT to thereby drive the panel E1 to cause same to emit light.

When the acceleration SW2 is first turned on in a state where the auto mode on/off subswitch SW1-1 is on or the auto mode is effective, the electrolytic capacitor C12 is charged electrically. The charges in the capacitor C12 are gradually discharged through the resistor R4, so that the electrical potential of the capacitor C12 decreases gradually.

When the inclination switch SW3 is turned on within a predetermined time in which the potential of the electrolytic capacitor C12 is above a predetermined or threshold voltage of the FET, the FET is turned on to thereby drive the panel EL with the blocking oscillation to cause the panel to emit light.

When the inclination switch SW3 maintains its on state, the charges in the capacitor C12 are discharged through the resistors R13 and R14. Thus, when the voltage across the capacitor C12 falls below the threshold voltage of the FET, the FET turns off to thereby stop the blocking oscillation and put off the panel EL automatically.

The illuminating operation of the wristwatch which include the switch mechanism and the lighting circuit, depending on the operated position of the switch SW1, will be described next.

(a) "Neutral" Position

Normally, the switch SW1 is located at the "neutral" position where, as shown in FIG. 7, the auto mode on/off subswitch SW1-1 is off to thereby inhibit setting the auto mode, and the temporary lighting subswitch SW1-2 is off. Even when in this state the acceleration switch SW2 and the inclination switch SW3 are turned on by the user's motion to look at time displayed on the wristwatch worn on his or her wrist, the panel EL is not lighted up.

(b) "Pushed-in" Position

Figure 9:
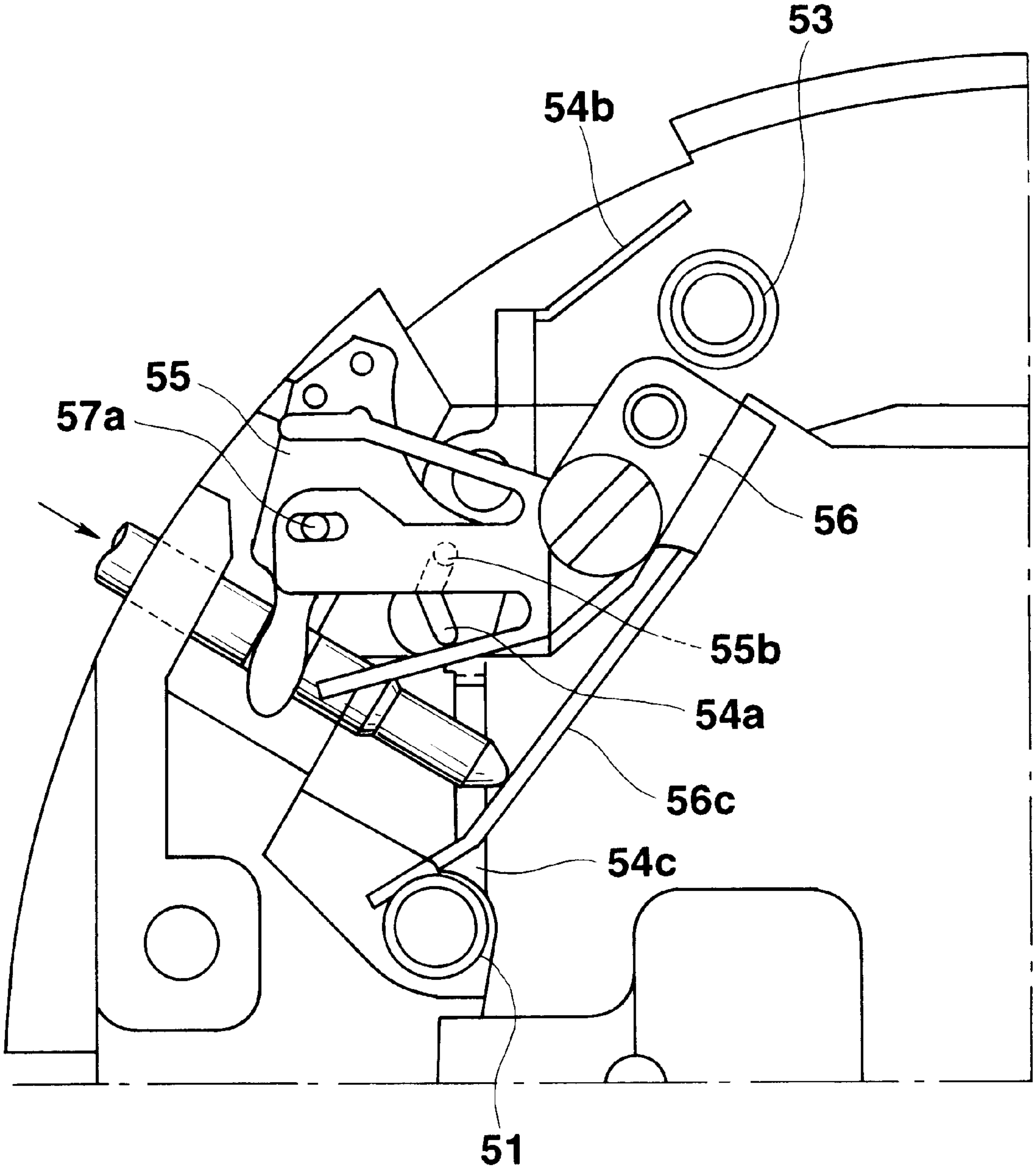
FIG. 9 shows the mechanism of the switch SW1 at a pushed-in position.

Assume that the user has pushed in the switch SW1 at the "neutral" position to the "pushed-in" position. This turns off the auto mode subswitch SW1-1, as shown in FIG. 9, to inhibit setting the auto mode and turn on the subswitch 1-2.

This turns on the FET of the lighting circuit to start blocking oscillation and light up the panel EL, as mentioned above. By releasing the pushed-in operation of the switch SW1, the switch SW1 returns to its "neutral" position to turn off the subswitch SW1-2 and put off the panel E1.

(c) "Pulled-Out" Position

When the user pulls out the switch SW1 at the "neutral" position to the "pulled-out" position, the temporary lighting subswitch SW1-2 is turned off, and the auto mode on/off subswitch SW1-1 is turned on to make the auto mode effective, as shown in FIG. 8.

In this case, unless an operation or posture to turn on the inclination switch SW3 within a predetermined time after the acceleration switch SW2 is turned on is given to the wristwatch, the panel EL does not light up.

That is, when the user makes a motion to look at the time displayed on the wristwatch worn on his or her wrist by moving same, the inclination switch SW3 is caused to assume a predetermined posture or inclination within a predetermined time after the shock or acceleration is given to the acceleration switch SW2. Thus, as described above, the inclination switch SW3 is turned on within a predetermined time in which the voltage across the capacitor C12 charged since the acceleration switch SW2 is turned on is above the threshold voltage of the FET, and the panel EL is lighted up automatically.

When the voltage across the capacitor C12 falls below the threshold voltage of the FET a predetermined time after the panel EL is lighted up, the blocking oscillation stops and the panel EL is put off automatically.

As described above, according to the present embodiment, when the inclination switch SW3 is turned on within a predetermined time after the acceleration switch SW2 is turned on in the auto mode where the auto mode on/off subswitch SW1-1 is on, the lighting circuit lights up the panel EL and puts off same automatically after a predetermined time has passed. If the auto mode subswitch SW1-1 is off, setting the auto mode is inhibited. Thus, even when the user makes gestures to look at the wristwatch, there is no possibility that the panel EL will be lighted up. As a result, the panel EL is not recklessly lighted up excluding by the user's intended motion, and useless power consumption is suppressed to prolong the battery life.

While in the particular embodiment the panel lighting circuit which uses the inventive switch device is illustrated, the present invention is not limited to that case. For example, the present switch device is, of course, applicable to a driver which drives a liquid crystal display unit. In this case, if the user makes gestures to look at the wristwatch worn on his or her wrist, as in the above embodiment, the inclination switch SW3 is turned on within a predetermined time after the acceleration switch SW2 has been turned on. Thus, the display unit is driven to display the current time and date, and turned off automatically a predetermined time later to erase the display. Alternatively, the inventive switch device may be used for starting and stopping a stopwatch or a timer for measuring purposes.

While in the embodiments the temporary lighting subswitch SW1-2 and the auto mode on/off subswitch 1-1 are illustrated as being realized as a mechanical switch, the present invention is not limited to that particular case. For example, the switch may be replaced with a transparent touch switch sheet spread over the glass plate of the wristwatch, a pressure sensitive switch which is provided on a side of the case so as to be turned on/off depending on the magnitude of pressure applied to the switch, or a touch switch which is turned on/off depending on a change in a static capacity.

While in the particular embodiment the acceleration switch is illustrated as being turned on when the wristwatch receives acceleration at 12 o'clock, it may be turned on when the wristwatch receives acceleration at any direction other than 12 o'clock. The acceleration switch and the inclination switch may be replaced with switches having other structures or semiconductor sensors. In addition, the present invention may be applicable to small electronic devices in addition to the wristwatches.

What is claimed is:

1. A switch device comprising:

first switch means turned on depending on a shock given to the switch device;

second switch means turned on when the switch device assumes a predetermined posture;

circuit means for performing a predetermined operation; and control means responsive to said first and second switch means turning on for causing said circuit means to perform the predetermined operation.

2. The switch device according to claim 1, wherein said control means comprises detection means for detecting that said second switch means is turned on within a predetermined time after said first switch means is turned on; and means responsive to said detection means detecting that said second switch means is turned on within the predetermined time after said first switch means is turned on for causing said circuit means to perform the predetermined operation.

3. The device according to claim 1, further comprising switch means for inhibiting the operation of said control means.

4. The switch device according to claim 1, wherein said circuit means comprises means for driving a illuminator.

5. The switch device according to claim 1, wherein said first switch means comprises an acceleration switch turned on in response to predetermined acceleration being given to the switch device.

6. The switch device according to claim 1, wherein said second switch means comprises an inclination switch operative in response to said switch device assuming a predetermined angle.

7. An electronic device comprising:

display means;

illuminating means for illuminating said display means;

first switch means turned on in response to a shock given to the electronic device;

second switch means for detecting a posture of the electronic device, said second switch means being turned on when the electronic device assumes a predetermined posture; and illumination control means responsive to said first and second switch means turning on for operating said illuminating means.

8. The electronic device according to claim 7, wherein said illumination control means comprises detecting means for detecting that said second switch means is turned on within a predetermined time after said first switch means is turned on; and means responsive to said detecting means detecting that said second switch means is turned on within the predetermined time after said first switch means is turned on for driving said illuminating means.

9. The electronic device according to claim 7, comprising switch means for inhibiting the operation of said illuminating means.

10. The electronic device according to claim 7, wherein said first switch means comprises an acceleration switch turned on in response to predetermined acceleration applied to the electronic device.

11. The electronic device according to claim 7, wherein said second switch means comprises an inclination switch turned on in response to the electronic device assuming a predetermined angle.

12. The switch device according to claim 7, wherein said illuminating means comprises an electroluminescence element.

13. The switch device according to claim 7, wherein said display means comprises time display means for displaying time.

14. The switch device according to claim 13, wherein said time display means comprises means for displaying time with hands.

15. The switch device according to claim 13, wherein said time display means, illuminating means, first switch means, second switch means and illumination control means are enclosed within a wristwatch case.

* * * * *